United States Patent [19]

Hasiuk

[11] Patent Number: 5,065,702
[45] Date of Patent: Nov. 19, 1991

[54] DISPOSABLE LITTER CONTAINER

[76] Inventor: Aaron S. Hasiuk, 1310 Frost Hallow Rd., Levittown, Pa. 19101

[21] Appl. No.: 657,524

[22] Filed: Feb. 19, 1991

[51] Int. Cl.⁵ ............................................. A01K 1/00
[52] U.S. Cl. ................................................... 119/168
[58] Field of Search .............. 119/165, 167, 168, 169, 119/170, 19; 220/666, 85 B

[56] References Cited

U.S. PATENT DOCUMENTS

| | | | |
|---|---|---|---|
| 216,227 | 6/1879 | Sedgwick | 220/666 X |
| 3,014,516 | 12/1961 | Mueller | 220/666 X |
| 3,480,059 | 11/1969 | Schoening | 220/666 X |
| 3,581,977 | 6/1971 | Kirsky et al. | 229/37 |
| 4,161,157 | 7/1979 | Haugen | 119/165 |
| 4,271,787 | 6/1981 | Wellman | 119/168 |
| 4,522,150 | 6/1985 | Gershman | 119/165 |
| 4,541,360 | 9/1985 | Higgins | 119/168 |
| 4,667,622 | 5/1987 | Breault | 119/165 |
| 4,711,198 | 12/1987 | Mossbarger | 119/168 |
| 4,724,955 | 2/1988 | Martin | 206/204 |
| 4,739,725 | 4/1988 | Fennelly | 119/168 |
| 4,760,816 | 8/1988 | Rhodes | 119/165 |
| 4,776,300 | 10/1988 | Braddock | 119/168 |
| 4,782,788 | 11/1988 | Arcand | 119/168 |
| 4,787,335 | 11/1988 | Carlyon | 119/170 |
| 4,846,103 | 7/1989 | Brown | 229/125 |
| 4,940,016 | 7/1990 | Heath | 229/132 |

Primary Examiner—Gene Mancene
Assistant Examiner—R. Thomas Price
Attorney, Agent, or Firm—Paul & Paul

[57] ABSTRACT

An extensible disposable litter container receives the waste of household pets, such as cats. The container is extensible from a closed position to an open position, and includes a rectangular tray for litter, and a cover with a handle which is releasably attached to the tray when the container is closed. A collapsible, pleated wall with a door extends between the tray and the cover, the wall biasing the container open. Detents maiantain the container in a closed position after use.

9 Claims, 2 Drawing Sheets

DISPOSABLE LITTER CONTAINER

BACKGROUND OF THE INVENTION

1. Field of the Invention

The present invention relates generally to animal care, and more particularly to containers for litter for receiving the waste of household pets.

2. Brief Description of the Prior Art

Litter boxes are well known to urban pet owners, and in particular cat owners. Litter boxes typically contain a granular adsorbent material for adsorbing pet waste and the accompanying odors. Often an open box is used, with the result that odor control is at best only partially effective, whatever the specific material used as an adsorbent. Animals are apt to scatter soiled litter and waste from open boxes when entering or leaving the boxes, and by instinctively "digging" into the adsorbent.

The animal waste itself represents a potential health hazard to the pet owner and others, and especially to pregnant women.

Closed boxes large enough to accommodate household pets such as cats can be difficult and uneconomical to manufacture, store and ship. On the other hand there is a need for an easy to use enclosed container for pet litter which can reduce the potential health hazards associated with contact with the animal waste, and which can be readily disposed of after use. Numerous attempts have been made to address the problem. For example, U.S. Pat. Nos. 3,581,977, 4,711,198, 4,782,788, 4,846,103, and 4,940,016 each provide collapsible, disposable litter boxes. However, each of these has significant shortcomings. For example, the litter box shown in U.S. Pat. No. 4,940,016 requires multiple tabs between sides and portions of the top of the container to be engaged when the container is opened, and disengaged when the container is closed prior to being discarded. This can be time-consuming and potentially very frustrating. Similarly, the box shown in U.S. Pat. No. 4,846,103 requires several steps to set up or take down. The box shown in U.S. Pat. No. 4,711,198 appears very easy to set up and take down, but provides only limited room for the animal inside the box, given the amount of floor space it requires. The boxes of U.S. Pat. Nos. 3,581,977 and 4,782,788 are each only partially enclosed. There is a continuing need for an easy-to-use disposable litter container, which protects against exposure to soiled litter and the dust associated with it.

SUMMARY OF THE INVENTION

The present invention provides an extensible disposable litter container for receiving the waste of household pets, such as cats. The container is extensible from a closed position to an open position, and includes a rectangular tray having a floor and opposing sides and ends for containing litter material, as well as a rectangular cover member having opposing sides and ends. The cover member has a handle which is releasably attached to the tray when the container is in the closed position. In addition, the cover member has at least one vent communicating with the atmosphere for equalizing pressure inside and outside the container when the container is opened or closed. A generally cylindrical, collapsible wall extends between the rectangular tray and the cover member and encloses the interior of the container. The wall has a door formed therein for entry and egress of household pets. The container also includes at least one spring means extending between the tray and the cover member. The spring means is compressed when the container is in the closed position, and extends between the cover member from the tray when the cover member is released from the tray and the container assumes the open position. Preferable, the door is preformed in the wall by a plurality of perforations, and the pet owner tears open the door along the perforations after opening the container. The door is preferably provided with resealable adhesive for affixing the door to the container to hold the door either open or closed. Preferably, the container also includes detent means for releasably attaching the cover member to the tray when the container is in the closed position, so that the container can be closed and sealed when the litter inside is no longer effectively adsorbing the animal waste or its odor, and the used container easily disposed of.

DETAILED DESCRIPTION

Figure 1:
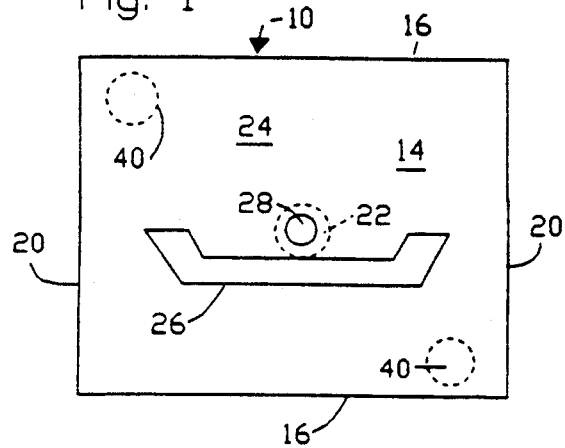
FIG. 1 is a front elevational view of a first embodiment of the container of the present invention shown in a closed position.

Referring now to the drawings in detail, wherein like reference numerals indicate like elements in each of the several views, reference is first made to FIG. 1, wherein a container 10 according to the present invention is shown in a front elevational view in a closed position The container 10 is preferably shipped to the consumer encased in a flexible packaging material such as cellophane or the like (not shown), which is removed by the consumer prior to use.

The container 10 includes a rectangular lower tray 12 containing an adsorbent litter material such as clay (not shown) and a rectangular cover member or cover 14. A pair of paper seals 15 adhere to the sides of both the tray 12 and the cover 14 during shipment. These are broken by the consumer after the container 10 is removed from its packaging.

The rectangular tray 12 can be about twelve inches by sixteen inches, and deep enough to contain about two inches of litter material. The rectangular cover 14 has a pair of opposed sides 16, a pair of opposed ends 20 and a top 24 from which extends a handle 26 for opening and carrying the container 10. After the container 10 is removed from the packaging and the seals 15 are broken, the consumer lifts on the handle 26 to pull the cover 14 away from the tray 12 to open the container 10.

A vent or air valve 28 is formed in the top 24 to permit air to enter the container 10 when it is opened and to escape when it is closed. The vent 28 can simply be a hole cut in the top 24 of the cover 14; however, a one-way valve responsive to a pressure difference between the interior of the container 10 and the atmosphere is preferably employed. A filter 22 formed from a circle of fiberous filter material adhered to the underside of the cover 14 over the vent 28 restrict litter dust from being forced out the vent 28 when the container 10 is closed.

The rectangular lower tray 12 has pairs of opposed sides 30 and ends 32 and a floor 34, and is sized to fit within the cover 14 when the container 10 is closed. The sides 30 of the tray 12 have a plurality of detents 36 formed therein for securing the cover 14 to the tray 12 when the container 10 is closed after the litter material has become soiled. The sides 16 of the cover 14 include a plurality of cutouts 38, each for receiving a corresponding detent 36. As shown in the plan view of FIG. 2, under the top 24 of the cover 14 there are a pair of helical spring means or springs 40 extending from the underside of the top 24 of the cover 14 to the floor 34 of the tray 12. When the container 10 is closed, these springs 40 are compressed. However, as soon as the seals 15 are broken, the springs 40 bias the container 10 to an open position, as shown in the perspective view of FIG. 3. The handle 26 can be simply cut from the top 24 of the cover 14, as shown in FIG. 2, with the handle 26 being bent upward (as shown in FIG. 1) just prior to initially opening the container 10.

Figure 3:
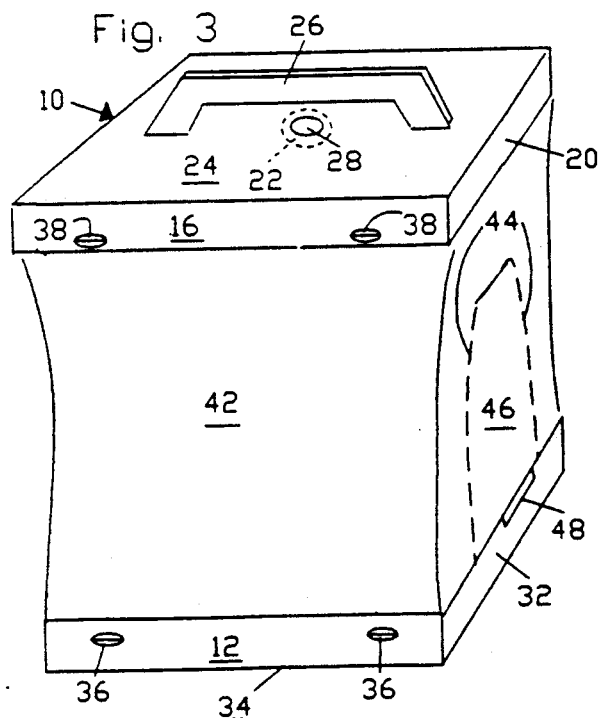
FIG. 3 is a perspective view of the container of FIG. 1 shown in an open position.

As seen in FIG. 3, a generally cylindrical, collapsible wall 42 extends between the tray 12 and the cover 14, enclosing the interior of the container 10 when the container is in the open position. The wall 42 has perforations 44 extending in a pair of generally parallel vertical lines in a portion of the wall 42 extending between corresponding ends 20, 32 of the cover 14 and tray 12 respectively, the vertical lines being connected by a horizontal line of perforations positioned proximate the end 32 of the tray 12. A tab 48 is permanently affixed to the wall 42 within the perforations 44, and releasably affixed with a resealable adhesive to the end 32 of the tray 12. To open the container 10 to permit an animal to enter, the tab 48 is firmly grasped and lifted upward to tear the perforations 44 to form a door 46 in the wall 42. The tab 48 has resealable adhesive on both its inside and outside surfaces, permitting the door 46 to be fastened in a open position by lifting the door 46 up and back over the top 24 of the cover 14 and adhering the tab 48 to the cover 14 (not shown). If desired, the perforations can be arranged so that the door opens to the side (not shown). Alternatively, a hook or latch can be can by substituted for the tab 48 so that the door 46 can be secured in an open or closed position (not shown).

To close the container 10 prior to disposal after the litter within it has been soiled, the tab 48 is lifted from the cover 14, and the door 46 is closed and the tab 48 is reattached to the tray 12. The cover 14 is then simply pushed down, compressing the springs 40, until the detents 36 engage their corresponding cutouts 38, the collapsing wall 42 being guided inward away from the detents 36.

Figure 2:
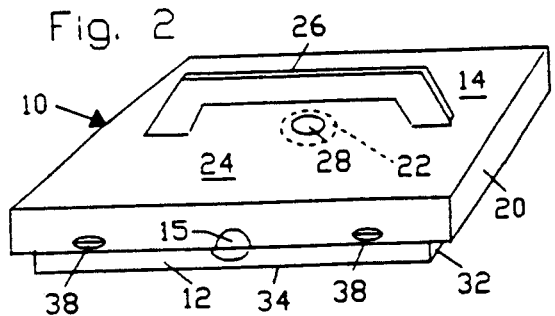
FIG. 2 is a plan view of the container of FIG. 1.

The tray 12 and cover 14 are preferably formed from a lightweight, rigid material such as cardboard or a rigid plastic material, while the wall 42 of the container shown in FIGS. 1-3 is preferably formed from flexible plastic film stock. If cardboard is used to form the tray 12, it is preferably treated with a moisture barrier-forming substance such as a wax coating, or lined with a moisture-impervious plastic sheet, so that moisture is retained within the container 10. Alternatively, the wall 42 is closed at its bottom. The wall 42 is secured to the cover 14 and the tray 12 by conventional means, such as by an adhesive, by ultrasonic welding, or the like.

Figure 4:
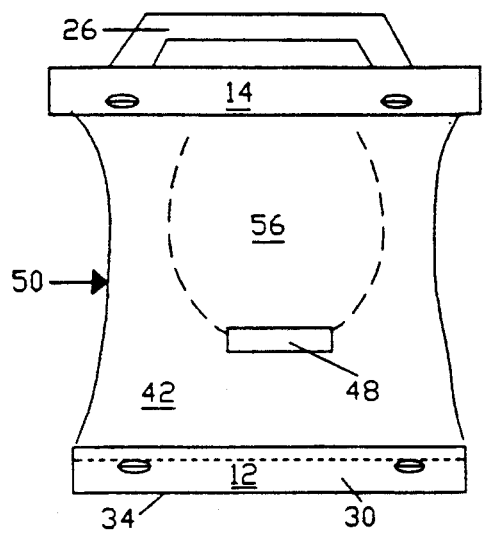
FIG. 4 is a front elevational view of a second embodiment of the container of the present invention shown in an open position.

FIG. 4 illustrates a second embodiment of the present invention. The container 50 has a door 56 formed in wall 42 between corresponding sides 16, 30 of the cover 14 and tray 12 respectively. In this case, the door 56 is bounded by an arc of perforations 54 and set in the upper two-thirds of the wall 42, and the additional height of the door 56 above the tray 12 reduces the amount of litter 58 which is scattered out of the container 50 by an animal using the container 50.

Figure 5:
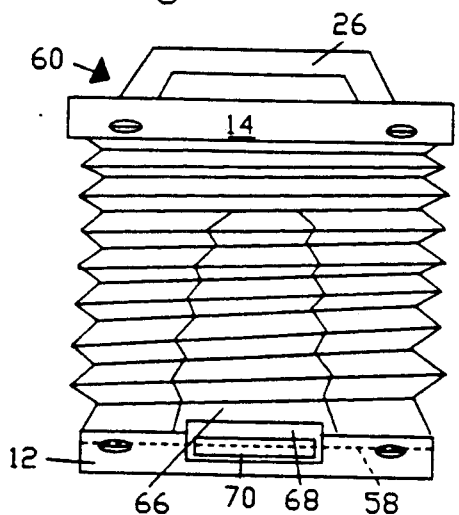
FIG. 5 is a front elevational view of a third embodiment of the container of the present invention shown in an open position.
Figure 6:
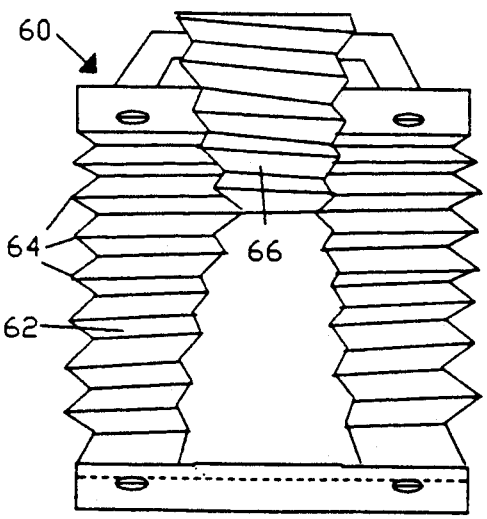
FIG. 6 is a front elevational view of the container of FIG. 5 shown in an open position with its door open.
Figure 7:
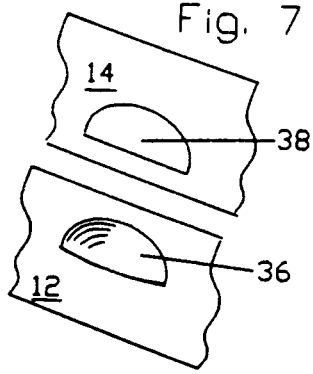
FIG. 7 is a fragmentary isometric view of the container of FIG. 1 showing a detent for sealing the closed container.

A third embodiment of the container of the present invention is shown in FIG. 5. In this case, the container 60 has a wall 62 formed with a plurality of concertina pleats or folds 64 and from a semi-rigid plastic material. The rigidity of the wall 62 opposes compression, and wall 62 itself serves as a biasing or spring means to push the container 60 and keep the container 60 in an open position when the detents 36 have been released. Accordingly, there is no need for internal springs to accomplish this function in this version of the container. The container 60 has a door 66 formed in wall 62 and having a tab 68 releasably and resealably securing the door 66 to one of the sides 30 of the tray 12. The tab 68 has a piece of release paper 70 covering a pad of adhesive material adhered to the outside surface of the tab 68. When the door 66 is opened, such as shown in FIG. 6, the release paper 70 is removed to permit the door to be bent back over the wall 62 and the cover 14 and secured to the cover 14 with the pad of adhesive material. After the litter 58 inside the container 60 has become soiled, the door 66 is closed, and the cover 14 is pressed down onto the tray 12 until the detents 36 engage the corresponding cutouts 38. The accordion-pleated wall 62 is compressed, with the folds 64 advantageously opposing the increased pressure within the container 60 as it is compressed, so that the no portions of the wall 62 become positioned between the detents 36 and the cutouts 38 as the container 60 is closed.

FIG. 6 is a expanded, fragmentary view of one of the interengaging detents 36 and cutouts 38 shown as the container is being closed.

Various modifications can be made in the details of the embodiments of the container of the present invention, all within the spirit and scope of the appended claims. For example, the cover and the tray can be circular or elliptical in shape rather than being rectangular. Similarly, the litter can be packaged separately from the container, with the container being filled with litter only after it is opened up, thus reducing the shipping weight of the container.

I claim:
1. An extensible disposable litter container for receiving the waste of household pets, the container being extensible from a closed position to an open position, the container comprising:
   a rectangular tray having a floor and opposing sides and ends for containing litter material;
   a rectangular cover member having opposing sides and ends, the cover member having a handle extending therefrom, the cover member being releasably attached to the tray when the container is in the closed position, the cover member having at least one vent communicating with the atmosphere;

a collapsible wall extending between the rectangular tray and the cover member and enclosing the interior of the container, the wall having a door formed therein for entry and egress of household pets; and at least one spring means extending between the tray and the cover member, the spring means being compressed when the container is in the closed position, the spring means extending the cover member from the tray when the cover member is released from the tray and the container assumes the open position.

2. A container according to claim 1 wherein the door is preformed in the wall by a plurality of perforations.

3. A container according to claim 2 wherein the door is provided with resealable adhesive means for affixing the door in an open position and in the closed position.

4. A container according to claim 1 further comprising detent means for releasably attaching the cover member to the tray when the container is in the closed position.

5. A container according to claim 1 wherein the wall comprises the spring means.

6. A container according to claim 1 further comprising animal litter material within the tray.

7. A container according to claim 1 wherein the wall is formed with a plurality of concertina pleats.

8. An extensible disposable litter container for receiving the waste of household pets, the container being extensible from a closed position to an open position, the container comprising:

a rectangular tray having a floor and opposing sides and ends for containing litter material;

a rectangular cover member having opposing sides and ends, the cover member having a handle extending therefrom, the cover member being releasably attached to the tray when the container is in the closed position, the cover member having at least one vent communicating with the atmosphere;

a generally cylindrical, collapsible wall extending between the rectangular tray and the cover member and enclosing the interior of the container, the wall being formed with a plurality of concertina pleats; the wall having a door formed therein for entry and egress of household pets, the door being preformed in the wall by a plurality of perforations, the door being provided with resealable adhesive means for affixing the door in an open position and in the closed position;

at least one spring means extending between the tray and the cover member, the spring means being compressed when the container is in the closed position, the spring means extending the cover member from the tray when the cover member is released from the tray and the container assumes the open position; and detent means for releasably attaching the cover member to the tray when the container is in the closed position.

9. A container according to claim 8 wherein the wall comprises the spring means.

* * * * *